United States Patent
Kubo et al.

(10) Patent No.: US 9,181,829 B2
(45) Date of Patent: Nov. 10, 2015

(54) EXHAUST GAS PURIFICATION DEVICE OF INTERNAL COMBUSTION ENGINE

(71) Applicant: ISUZU MOTORS LIMITED, Tokyo (JP)

(72) Inventors: Hiroshi Kubo, Yamato (JP); Takao Onodera, Ayase (JP); Hitoshi Satou, Ebina (JP); Masahiro Kajiyama, Fujisawa (JP); Tetsuya Murata, Yokohama (JP); Kenzou Yaginuma, Yokohama (JP); Hiroyuki Ishikawa, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/353,400

(22) PCT Filed: Oct. 18, 2012

(86) PCT No.: PCT/JP2012/076981
§ 371 (c)(1),
(2) Date: Apr. 22, 2014

(87) PCT Pub. No.: WO2013/061860
PCT Pub. Date: May 2, 2013

(65) Prior Publication Data
US 2014/0290223 A1    Oct. 2, 2014

(30) Foreign Application Priority Data

Oct. 28, 2011    (JP) ................. 2011-237230

(51) Int. Cl.
*F01N 3/00*    (2006.01)
*F01N 3/10*    (2006.01)
(Continued)

(52) U.S. Cl.
CPC .............. *F01N 3/035* (2013.01); *F01N 3/0253* (2013.01); *F01N 9/002* (2013.01); *F01N 2900/102* (2013.01); *Y02T 10/47* (2013.01)

(58) Field of Classification Search
CPC ... F01N 2900/102; F01N 9/002; F01N 3/035; F01N 3/0253; Y02T 10/47
USPC ............................ 60/286, 295, 297, 303, 311
See application file for complete search history.

(56) References Cited

U.S. PATENT DOCUMENTS

| | | | |
|---|---|---|---|
| 5,193,340 A | * | 3/1993 | Kamihara ...................... 60/286 |
| 5,287,698 A | * | 2/1994 | Shinzawa et al. ............... 60/286 |

(Continued)

FOREIGN PATENT DOCUMENTS

| | | |
|---|---|---|
| JP | 2005-155532 | 6/2005 |
| JP | 2006-233833 | 9/2006 |
| JP | 2011-89479 | 5/2011 |

OTHER PUBLICATIONS

Written Opinion of the International Searching Authority mailed Nov. 27, 2012 in corresponding International Application No. PCT/JP2012/076981.

(Continued)

*Primary Examiner* — Jason Shanske
*Assistant Examiner* — Diem Tran
(74) *Attorney, Agent, or Firm* — Staas & Halsey LLP

(57) ABSTRACT

An exhaust gas purification device includes an exhaust gas after-treatment device provided in an exhaust passage of an internal combustion engine, and has an oxidation catalyst and a DPF or diesel particulate filter. The exhaust gas purification device also includes an exhaust pipe injector which feeds a fuel to the oxidation catalyst, and a control unit which controls regeneration of the filter by supplying the oxidation catalyst with the fuel from the exhaust pipe injector. The control unit determines whether the filter is in a regeneration-possible state, i.e., whether the oxidation catalyst is maintained at a high temperature allowing regeneration of the filter. If the control unit determines during regeneration control of the filter that the filter is not in the regeneration-possible state, then the control unit halts the regeneration control until the regeneration-possible state is reached.

16 Claims, 2 Drawing Sheets

(51) Int. Cl.
*F01N 3/02* (2006.01)
*F01N 3/035* (2006.01)
*F01N 9/00* (2006.01)
*F01N 3/025* (2006.01)

(56) References Cited

U.S. PATENT DOCUMENTS 8,316,637 B2 * 11/2012 Iwashita et al. ............... 60/295
8,572,951 B2 * 11/2013 Gallagher et al. .............. 60/295
2008/0163609 A1  7/2008 Satou et al.

OTHER PUBLICATIONS

Patent Abstracts of Japan, Publication No. 2005-155532, Published Jun. 16, 2005.
Patent Abstracts of Japan, Publication No. 2006-233833, Published Sep. 7, 2006.
Patent Abstracts of Japan, Publication No. 2011-089479, Published May 6, 2011.
International Search Report mailed Nov. 27, 2012 in corresponding International Patent Application No. PCT/JP2012/076981.

* cited by examiner

EXHAUST GAS PURIFICATION DEVICE OF INTERNAL COMBUSTION ENGINE

CROSS-REFERENCE TO RELATED APPLICATIONS

This application claims the foreign priority benefit of Japanese Application No. 2011-237230 filed Oct. 28, 2011, the contents of which are incorporated herein by reference, which serves as priority for PCT Application No. PCT/JP2012/076981 filed Oct. 18, 2012.

TECHNICAL FIELD

The present invention relates to an exhaust gas purification device of an internal combustion engine, and more particularly to an exhaust gas purification device that has an exhaust gas after-treatment device equipped with an oxidation catalyst and a filter adapted to collect particulate matter ("PM") contained in the exhaust gas.

BACKGROUND ART

For example, a diesel particulate filter (referred to as "DPF" hereinafter) is known as a filter to collect particulate matter contained in an exhaust gas discharged from a diesel engine. Because the DPF has a limitation on an amount of particulate matter to be collected, it is necessary to periodically carry out regeneration, i.e., burning the accumulated particulate matter for removal of the accumulated particle matter. The regeneration of the DPF is performed by feeding an unburnt fuel to an oxidation catalyst provided upstream of the DPF by fuel injection into the exhaust pipe or by post injection. With such fuel injection, heat is generated upon oxidation, and the heat elevates the exhaust gas temperature to a PM combustion temperature.

LISTING OF REFERENCE(S)

PATENT LITERATURE 1: Japanese Patent Application Laid-Open Publication (Kokai) No. 2011-89479

SUMMARY OF THE INVENTION

When a delivery car or a similar type of vehicle moves in a delivery area in order to visit a plurality of designated places, the delivery car generally repeats running a relatively short distance and stopping for a while. Every time the delivery car arrives at a designated place, the engine of the delivery car is often turned off. As a result, the temperature of the oxidation catalyst drops in the delivery area. Thus, even if an unburnt fuel is fed to the oxidation catalyst to carry out the regeneration of the DPF, the oxidation may not proceed, and therefore the exhaust gas temperature may not be elevated to the PM combustion temperature. If the regeneration of the DPF continues while the exhaust gas temperature is not elevated, then more fuel is fed to the oxidation catalyst than necessary, and the fuel efficiency is deteriorated.

SUMMARY OF THE INVENTION

The present invention is proposed in view of such fact, and an object of the present invention is to suppress or eliminate wasteful feeding of the fuel to the oxidation catalyst when the regeneration of the DPF is carried out, and to effectively improve the fuel efficiency.

In order to achieve the above-mentioned object, an exhaust gas purification device of an internal combustion engine is provided according to the present invention. The exhaust gas purification device of the present invention is an exhaust gas purification device of an internal combustion engine for use in a vehicle, and includes an exhaust gas after-treatment device provided in an exhaust passage of the internal combustion engine and having an oxidation catalyst and a filter arranged therein in this order from the exhaust gas upstream side. The filter is configured to collect particulate matter contained in the exhaust gas. The exhaust gas purification device also includes a fuel feed unit configured to feed a fuel to the oxidation catalyst, and a control unit configured to control regeneration of the filter by causing the fuel feed unit to supply the oxidation catalyst with the fuel. The control unit also determines whether the filter is in a regeneration-possible state, i.e., in which the oxidation catalyst is maintained at a high temperature allowing regeneration of the filter, based on the travel distance of the vehicle. If the control unit determines during regeneration control of the filter that the filter is not in the regeneration-possible state, then the control unit halts the regeneration control until the control unit determines that the regeneration-possible state of the filter is reached.

When the control unit determines that the regeneration-possible state of the filter is reached while the control unit halts the regeneration control, then the control unit may restart the filter regeneration control.

The control unit may calculate the traveling distance of the vehicle from when the control unit determines that the filter is not in the regeneration-possible state. When the calculated traveling distance reaches a predetermined distance, the control unit may determine that the filter regeneration-possible state is reached.

When the control unit determines that the filter regeneration-possible state is not reached and then the ignition switch of the vehicle is turned off, the control unit stores the traveling distance of the vehicle calculated by the time of this turning off. Subsequently, if the ignition switch of the engine is turned on, the control unit may subtract the stored traveling distance from a newly calculated traveling distance of the vehicle to obtain an after-subtraction traveling distance, and the control unit may determine that the filter regeneration-possible state is reached when the after-subtraction traveling distance reaches the predetermined traveling distance.

With the exhaust gas purification device of an internal combustion engine according to the present invention, it is possible to reduce or eliminate wasteful feeding of the fuel to the oxidation catalyst when the DPF is regenerated. Thus, the fuel efficiency is effectively improved.

DESCRIPTION OF THE EMBODIMENTS

Figure 1:
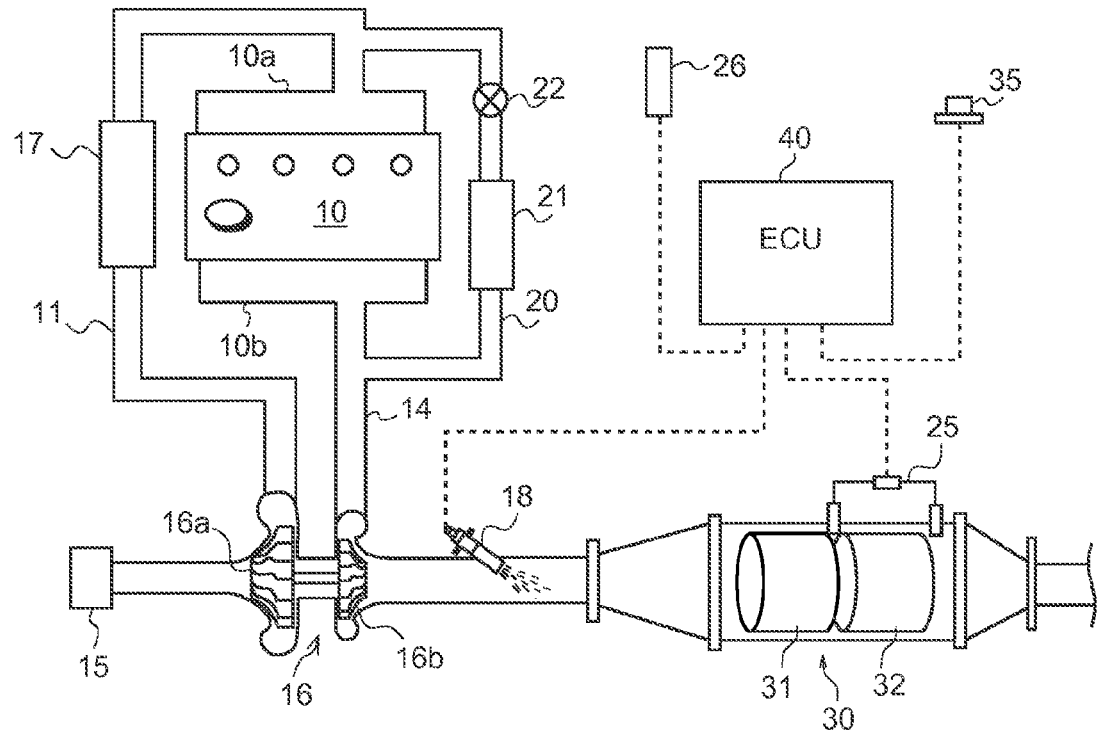
FIG. 1 is a schematic block diagram of an exhaust gas purification device of an internal combustion engine according to an embodiment of the present invention.
Figure 2:
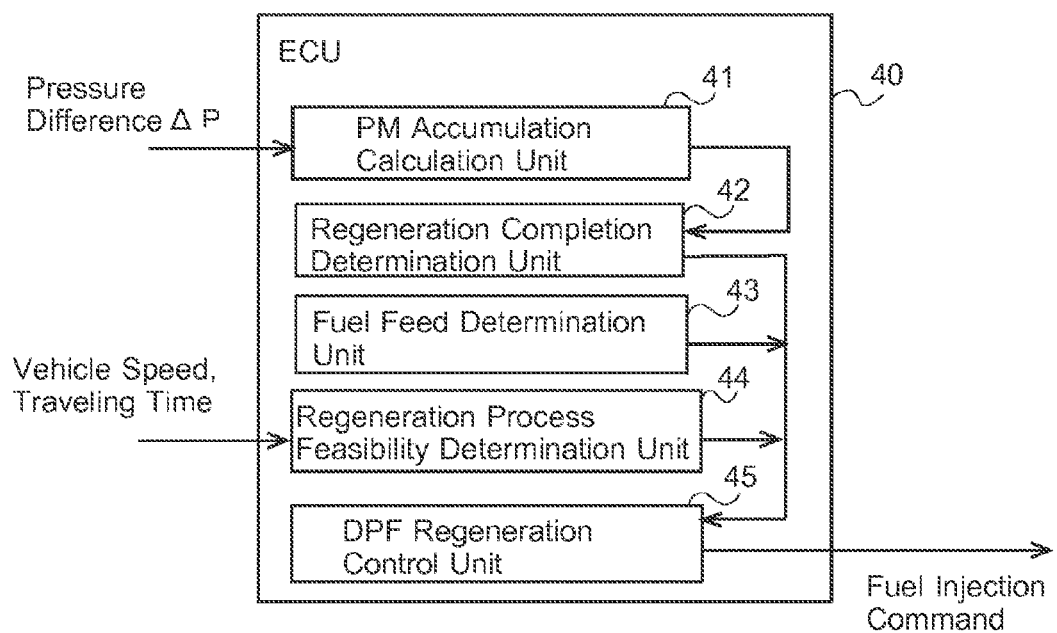
FIG. 2 is a functional block diagram of an electronic control unit ("ECU") used in the exhaust gas purification device of the internal combustion engine according to an embodiment of the present invention.
Figure 3:
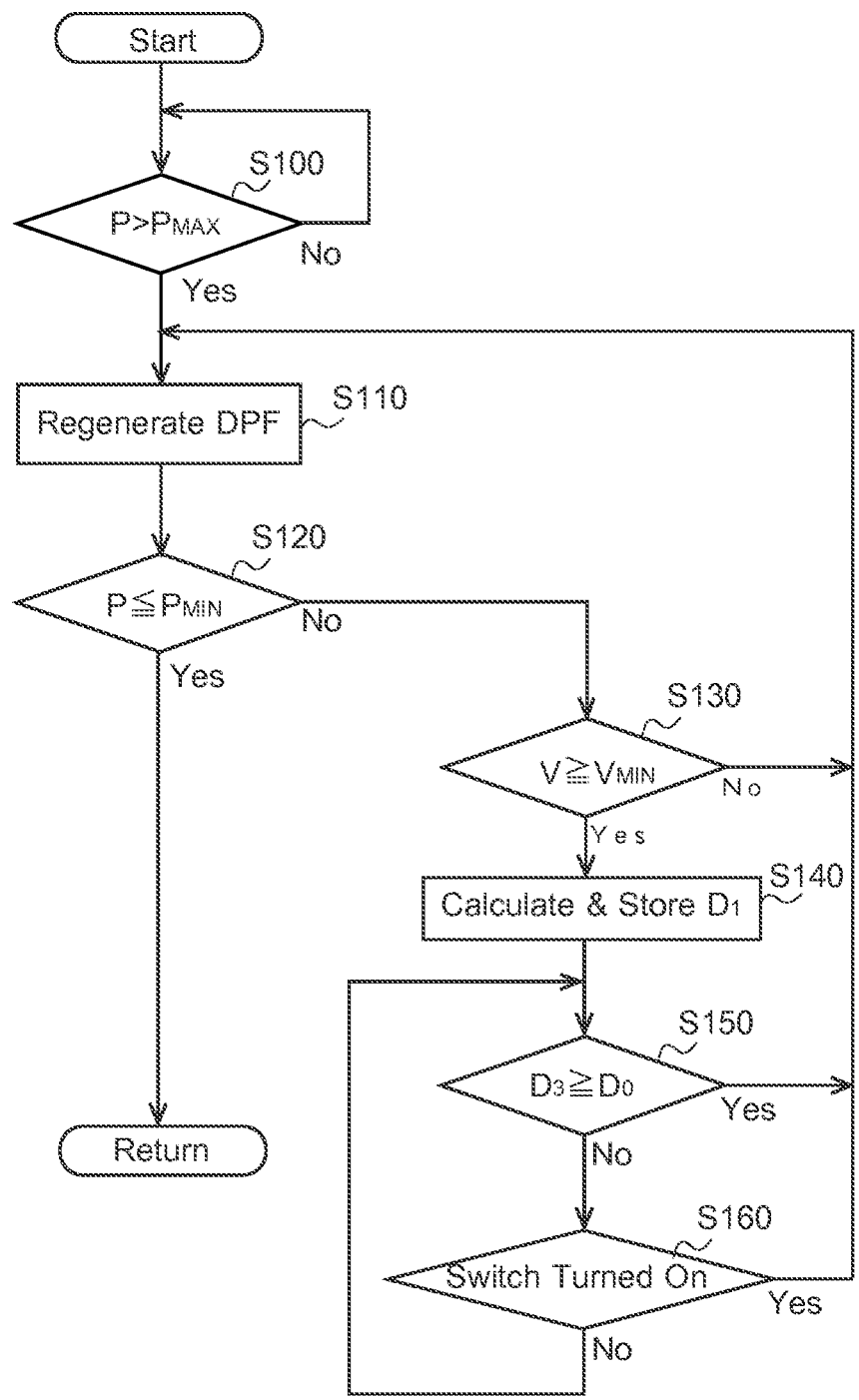
FIG. 3 is a flowchart of control performed by the exhaust gas purification device of the internal combustion engine according to an embodiment of the present invention.

Referring now to FIGS. 1-3, an exhaust gas purification device of an internal combustion engine according to embodiments of the present invention will be described. In the drawings, the same components are assigned the same reference numerals. The same names are used for the same components, and the components having the same names possess the same functions. Thus, the detailed description for the same components will not be repeated.

The exhaust gas purification device of an internal combustion engine according to this embodiment is installed on a truck, such as a delivery car (referred to as "vehicle" hereinafter). As shown in FIG. 1, an intake manifold 10a and an exhaust manifold 10b are attached to a diesel engine (simply referred to as "engine" hereinafter) 10. An intake air passage 11 is connected to the intake manifold 10a for introducing a-fresh air to the engine upon opening of intake valves (not shown), and an exhaust passage 14 is connected to the exhaust manifold 10b for discharging an exhaust gas upon opening of exhaust valves (not shown).

On the intake air passage 11, there are provided an air filter 15, a compressor 16a of a turbocharger 16 and an intercooler 17 in this order from the intake upstream side. On the exhaust passage 14, there are provided a turbine 16b of the turbocharger 16, an exhaust pipe injection device 18 and an exhaust gas after-treatment device 30 in this order from the exhaust upstream side. The exhaust passage 14 is connected to the intake passage 11 by an EGR passage 20. An EGR cooler 21 and an EGR valve 22 are provided on the exhaust gas recirculation ("EGR") passage 20.

The exhaust pipe injection device 18 injects a hydrocarbon (HC) of an unburnt fuel toward an oxidation catalyst unit 31 in the exhaust gas after-treatment device 30 located at the downstream side of the exhaust passage upon receiving a command signal issued from a DPF regeneration control unit 45 of an electronic control unit ("ECU") 40 (will be described).

The exhaust gas after-treatment device 30 includes the oxidation catalyst unit 31 and the DPF 32 disposed in this order from the exhaust upstream side. A differential pressure sensor 25 is provided on the exhaust gas after-treatment device 30 to detect a pressure difference between the exhaust upstream side and exhaust downstream side of the DPF 32.

The oxidation catalyst unit 31 has a known structure, and includes a ceramic carrier (or loader), which is made from a cordierite honeycomb structure body and other components, and an oxidation catalyst carried on the surface of the ceramic carrier. When the unburnt fuel is introduced to the oxidation catalyst unit 31 from the exhaust pipe injection device 18, the oxidation catalyst unit 31 oxidizes the fuel and generates a heat upon oxidation. This heat elevates the temperature of the exhaust gas.

The DPF 32 has a known structure, and is configured to collect (filter) particulate matter contained in the exhaust gas. When an amount of accumulated particulate matter in the filter reaches a predetermined upper limit, then the regeneration of the filter is carried out, i.e., a burning out process is carried out on the accumulated particulate matter for removal of the particulate matter. In the process of regenerating the DPF 32, an unburnt fuel is fed to the oxidation catalyst unit 31 from the exhaust pipe injection device 18, heat is generated upon the oxidation of the fuel, and the heat is used to elevate the exhaust gas temperature to a PM combustion temperature.

A selection switch 35 for triggering the regeneration process is a switch that is manually operated by a driver to select the execution of the regeneration process. For example, the regeneration process selecting switch 35 is provided in a driver's cab (not shown) of the vehicle. The regeneration process selecting switch 35 is connected to the ECU 40 (will be described in detail below) by electric wiring. When the regeneration process selecting switch is turned on by the driver, the regeneration process of the DPF 32 is performed.

The ECU 40 performs various controls on the engine 10 such as fuel injection control, and includes a known central processing unit ("CPU") as well as a read only memory, a random access memory, an input port, an output port and the like. In order to carry out such control, the ECU 40 receives output signals of various sensors such as the differential pressure sensor 25, a vehicle speed sensor 26 and an accelerator opening degree sensor (not shown) after these output signals are A/D converted.

As shown in FIG. 2, the ECU 40 includes, among other units, a PM accumulation calculation unit 41, a regeneration completion determination unit 42, a fuel feed amount determination unit 43, a regeneration process feasibility determination unit 44, and the DPF regeneration control unit 45. It should be noted that although these functional elements are included in the ECU 40 (a single hardware component) in this embodiment, one or more of these functional elements may be provided in a separate hardware component.

The PM accumulation calculation unit 41 calculates an amount of particulate matter accumulated by the DPF 32. Specifically, the ECU 40 stores a map (not shown) that shows the relationship between the pressure difference $\Delta P$ of an exhaust upstream side of the DPF 32 and an exhaust downstream side of the DPF 32 and the amount of accumulated particulate matter "P". The map is prepared in advance. The PM accumulation calculation unit 41 calculates (obtains) an amount of particulate matter accumulated in the DPF 32 by reading an amount of accumulation P, which corresponds to a detection value of the differential sensor 25, from the map.

It should be noted that if the differential pressure sensor 25 is not used, the ECU may store in advance a map that indicates an amount of particulate matter discharged per unit time that corresponds to an engine revolution speed and an engine load, which represent running conditions of the engine 10. Then, the ECU may calculate (obtain) an amount of accumulated particulate matter by reading, from the map, an amount of discharged particulate matter which corresponds to an integrated value of running time of the engine 10.

The regeneration completion determination unit 42 determines whether or not the regeneration of the DPF 32 by the DPF regeneration control unit 45 (will be described) is finished. Specifically, the lower threshold value $P_{MIN}$ of the particulate matter accumulation, which indicates the completion of the regeneration of the DPF 32, is stored in the ECU 40 in advance. The regeneration completion determination unit 42 determines that the regeneration of the DPF 32 by the DPF regeneration control unit 45 is completed when the amount of accumulation P calculated by the particulate matter accumulation calculator 41 reaches the lower threshold value $P_{MIN}$ of the particulate matter accumulation ($P \leq P_{MIN}$).

The fuel feed determination unit 43 determines whether or not an integrated value V of the fuel fed to the oxidation catalyst unit 31 from the exhaust pipe injection device 18 during the regeneration control performed by the DPF regeneration control unit 45 is enough to regenerate the DPF 32. Specifically, the ECU 40 stores in advance a lower threshold value $V_{MIN}$ of fuel consumption at the oxidation catalyst unit 31 that is necessary for the regeneration of the DPF 32. In order to calculate the integrated value V of the supplied fuel, an amount of fuel to be supplied to maintain a target temperature is calculated by the ECU 40 while the temperature of the DPF 32 is monitored with a temperature sensor (not shown), and the calculated amount of fuel to be supplied is added up (integrated) from the start of the DPF regeneration control (when the accumulated amount of particulate matter P reaches the predetermined upper limit value) to the present time. When the calculated integrated value V of the fuel to be supplied is equal to or greater than the lower threshold value $V_{MIN}$ ($V \geq V_{MIN}$) to be consumed, then the fuel feed determination unit 43 determines that the amount of fuel to be supplied is sufficient for the regeneration of the DPF 32.

The regeneration process feasibility determination unit 44 determines that the DPF 32 is in a regeneration-possible state when the traveling distance of the vehicle reaches a predetermined traveling distance which can maintain the temperature of the oxidation catalyst 31 at a high temperature for the regeneration of the DPF 32. Specifically, the ECU 40 stores in advance a traveling distance threshold value $D_0$, which is a traveling distance for the vehicle to go through the delivery area and an expected traveling distance for the vehicle to return to a service office. The traveling distance determination threshold value $D_0$ is rewritable from an external tool to allow the changing of the threshold value depending upon a vehicle to be used.

The regeneration process feasibility determination unit 44 calculates an absolute traveling distance $D_1$ from the start of the vehicle traveling until the fuel feed determination unit 43 determines that the amount of fuel to be supplied is enough for the regeneration of the DPF 32 ($V \geq V_{MIN}$) by a well known approach such as multiplying the vehicle speed by the traveling time and adding up these products, or obtaining a mileage meter count. The regeneration process feasibility determination unit 44 then stores the absolute traveling distance $D_1$, as a reference traveling distance, in the storage unit of the ECU 40. The regeneration process feasibility determination unit 44 also calculates another absolute traveling distance $D_2$ from the start of the vehicle traveling to the current time by a well known approach such as multiplying the vehicle speed by the traveling time up to the current time and adding up these products, or obtaining a mileage meter count. The regeneration process feasibility determination unit 44 subtracts the stored absolute traveling distance $D_1$ from the second absolute traveling distance $D_2$ to obtain a relative traveling distance $D_3$ ($D_3 = D_2 - D_1$). When the relative traveling distance $D_3$ reaches a traveling distance threshold value $D_0$, ($D_3 \geq D_0$), the regeneration process feasibility determination unit determines that the DPF 32 is in a regeneration-possible state. The absolute traveling distance $D_1$ stored in the ECU 40 is reserved (kept) even if the ignition key or switch of the vehicle is turned off (e.g., a driver pulls the key out from a key cylinder when he leaves the vehicle to bring something to a designated place).

The DPF regeneration control unit 45 controls the fuel injection of the exhaust pipe injection device 18 to carry out the regeneration of the DPF 32. Specifically, an accumulation upper threshold value $P_{MAX}$, which is a trigger value to burn and remove the particulate matter accumulated in the DPF 32, is stored in the ECU 40 beforehand. When the accumulated amount P of particulate matter calculated by the PM accumulation calculator 41 exceeds the accumulation upper threshold value $P_{MAX}$, the DPF regeneration control unit 45 sends a command signal to the exhaust pipe injection device 18 to cause the exhaust pipe injection device 18 to inject a fuel.

On the other hand, when the regeneration completion determination unit 42 determines that the regeneration of the DPF 32 is incomplete ($P > P_{MIN}$) and the fuel feed determination unit 43 determines that the amount of fuel to be supplied is sufficient for the regeneration of the DPF 32 ($V \geq V_{MIN}$), then the DPF regeneration control unit 45 suspends (or stops) the regeneration of the DPF 32 until the regeneration process feasibility determination unit 44 determines that the "regeneration-possible state" is reached. As a result, it is possible to avoid or reduce wasteful consumption of the fuel when the temperature of the oxidation catalyst 31 is low, e.g., when the vehicle is running in a delivery area.

If the driver of the vehicle turns on the regeneration process selection switch 35, the DPF regeneration control unit 45 carries out the regeneration of the DPF 32 regardless of the above-described conditions. In other words, even if the vehicle returns to the service office before the regeneration of the DPF 32 is carried out, the driver is manually and surely able to start the regeneration of the DPF 32.

Now, the control process executed by the exhaust gas purification device of the internal combustion engine according to this embodiment will be described with reference to FIG. 3. It should be noted that when the engine 10 is started (turning on of the ignition key), the last (most recent) control conditions/state of the engine 10 at the time of last deactivation (turning off of the ignition key), such as control step, an integrated value of supplied fuel V, and absolute traveling distance $D_1$ are used as the starting conditions/state. The control conditions/state of the engine 10 at the time of deactivation (when the ignition key is turned off) are stored in the storage unit of the ECU 40. Thus, the last control conditions/state are reserved even if the ignition key is turned off.

At Step S100, it is determined whether or not the accumulated amount of particulate matter P, which is calculated by the accumulated particulate matter calculator 41, exceeds the accumulation upper threshold $P_{MAX}$. If the accumulated amount of particulate matter P exceeds the accumulation upper threshold $P_{MAX}$, the controller proceeds to Step S110 to perform the regeneration of the DPF 32.

At Step S110, the regeneration of the DPF 32 is carried out by the DPF regeneration control unit 45. Specifically, the DPF regeneration control unit 45 sends a command signal to the exhaust pipe injection device 18 to cause the exhaust pipe injection device to inject a fuel. The exhaust pipe injection device 18 then supplies the oxidation catalyst 31 with an unburnt fuel.

At Step S120, the regeneration completion determination unit 42 determines whether or not the regeneration of the DPF 32 is complete. If the accumulated amount of particulate matter P, which is calculated by the accumulated particulate matter calculator 41, reaches the accumulation lower threshold $P_{MIN}$, the determination unit 42 determines that the regeneration of the DPF 32 is complete, and the controller proceeds to the RETURN box. On the other hand, if the accumulated amount of particulate matter P, which is calculated by the accumulated particulate matter calculator 41, is higher than the accumulation lower threshold $P_{MIN}$, the determination unit 42 determines that the regeneration of the DPF 32 is not complete, and the controller proceeds to Step S130.

At Step S130, the fuel feed determination unit 43 determines whether the integrated amount V of fuel supplied to the oxidation catalyst 31 from the exhaust pipe injection device 18 at Step S110 is sufficient for the regeneration of the DPF 32. If the integrated amount V of the supplied fuel is equal to or greater than the consumption lower threshold value $V_{MIN}$ ($V \geq V_{MIN}$), it is determined that the amount of supplied fuel is sufficient for the regeneration of the DPF 32, and the controller proceeds to Step S140. On the other hand, if the integrated amount V of the supplied fuel is smaller than the consumption lower threshold value $V_{MIN}$ ($V < V_{MIN}$), it is determined that the amount of supplied fuel is not sufficient for the regeneration of the DPF 32, and the controller returns to Step S110. Thus, the regeneration of the DPF 32 by the DPF regeneration control unit 45 is carried out again.

At Step S140, the regeneration process feasibility determination unit 44 calculates the absolute traveling distance $D_1$ from the start of the vehicle traveling until the fuel feed determination unit 43 determines that the amount of supplied fuel is sufficient for the regeneration of the DPF 32 ($V \geq V_{MIN}$). The absolute traveling distance $D_1$ is stored, as the reference traveling distance, in the ECU 40.

At Step S150, the regeneration process feasibility determination unit 44 calculates the absolute traveling distance $D_2$ from the start of the vehicle traveling to the current time. The regeneration process feasibility determination unit 44 calculates the relative traveling distance $D_3$ ($=D_2-D_1$), which is obtained by subtracting the absolute traveling distance $D_1$ (stored at Step S140) from the absolute traveling distance $D_2$, and determines whether the relative traveling distance $D_3$ reaches the traveling distance threshold value $D_0$, which can maintain the high temperature of the oxidation catalyst 31 for the regeneration of the DPF 32. If the relative traveling distance $D_3$ reaches the traveling distance determination threshold value $D_0$ ($D_3 \geq D_0$), it is determined that the DPF 32 is in the regeneration-possible state, and the controller returns to Step S110. On the other hand, if the relative traveling distance D3 does not reach the traveling distance determination threshold value $D_0$ ($D_3 < D_0$), it is determined that the DPF 32 is not in the regeneration-possible state, and the controller proceeds to Step S160.

At Step S160, it is determined whether or not the regeneration process selection switch 35 is turned on by the driver. If it is determined that the regeneration process selection switch 35 is turned on, the controller returns to Step S110 to perform the regeneration of the DPF 32.

On other hand, if it is determined that the regeneration process selection switch 35 is not turned on, then the controller returns to Step S150. In this manner, the regeneration of the DPF 32 is suspended (i.e., Steps S150 and S160 are repeated) until the relative traveling distance $D_3$ reaches the traveling distance determination threshold value $D_0$ and it is determined that the DPF 32 is in the regeneration-possible state or until the regeneration process selection switch 35 is turned on.

The operation and advantages of the exhaust gas purification device of the internal combustion engine according to this embodiment will be described.

The exhaust gas purification device of the internal combustion engine of this embodiment halts the regeneration of the DPF 32 until the traveling distance of the vehicle reaches a traveling distance that can maintain the temperature of the oxidation catalyst 31 at a high temperature. Specifically, when the temperature of the oxidation catalyst 31 drops, e.g., when the vehicle travels in the delivery area, the feeding of the unburnt fuel to the oxidation catalyst 31 is stopped. As a result, when the regeneration of the DPF 32 is carried out, wasteful feeding of the fuel to the oxidation catalyst 31 is reduced or avoided. This contributes to the effective improvement in the fuel efficiency.

When the ignition key is turned off, the ECU 40 of the exhaust gas purification device of the internal combustion engine according to this embodiment stores the absolute traveling distance $D_2$, which is a value at the time when the integrated amount of supplied fuel V is determined to be equal to or more than the consumption lower threshold value $V_{MIN}$. Therefore, the exhaust gas purification device prevents the vehicle from travelling a distance over the traveling distance determination threshold value $D_0$, which is set when the regeneration control on the DPF 32 is halted. Accordingly, the fuel efficiency can be improved, and it is possible to effectively prevent the DPF 32 from reaching the particulate matter collection limit while the regeneration control is halted. The DPF 32 may break down if the particulate matter collection limit is reached while the regeneration process is not carried out.

The exhaust gas purification device of the internal combustion engine according to this embodiment carries out the regeneration of the DPF 32 upon turning on of the regeneration process selection switch 35 by the driver, even if the traveling distance of the vehicle does not reach a traveling distance that can maintain the temperature of the oxidation catalyst 31 at a high temperature. Therefore, even if the vehicle returns to the service office before the regeneration of the DPF 32 is carried out, the driver's manual operation can surely trigger the regeneration of the DPF 32.

It should be noted that the present invention is not limited to the above-described embodiment. Suitable changes and modifications may be made to the above-described embodiment by a skilled person without departing from the spirit and scope of the present invention.

For example, although the step of halting the regeneration of the DPF 32 (Step S150) in the flowchart of FIG. 3 is executed after the first time regeneration of the DPF 32 (Step S110) in the illustrated embodiment, this step of halting may be executed prior to the first time regeneration of the DPF 32. With this modification, it is still possible to obtain the same advantages as the illustrated embodiment.

The fuel feeding to the oxidation catalyst 31 may not be necessarily carried out by the exhaust pipe injection device 18. For example, a post injection of the engine 10 may be used instead of the exhaust pipe injection device 18.

What is claimed is:

1. An exhaust gas purification device of an internal combustion engine mounted on a vehicle, comprising:
   an exhaust gas after-treatment device provided in an exhaust gas passage of the internal combustion engine and having an oxidation catalyst and a filter, the filter to collect particulate matter contained in an exhaust gas, the oxidation catalyst being located upstream of the filter in a flow direction of the exhaust gas;
   an exhaust pipe injector to supply an amount of fuel to the oxidation catalyst; and
   an electronic controller configured to—
   control the exhaust pipe injector to supply the fuel to the oxidation catalyst to control regeneration of the filter, and to determine whether the filter has reached a regeneration-possible state, in which a temperature of the oxidation catalyst is maintained at a high temperature and the filter is ready for regeneration,
   halt the regeneration of the filter until the electronic controller determines that the regeneration-possible state is reached, if the electronic controller determines, during the filter regeneration control, that the filter is not in the regeneration-possible state,
   calculate a first traveling distance from a time of a start of the vehicle traveling until a time when the electronic controller determines that the amount of supplied fuel is sufficient for the regeneration of the filter during the filter regeneration control,
   calculate a second traveling distance from a time of the start of the vehicle traveling to a current time;
   calculate a relative traveling distance by subtracting the first traveling distance from the second traveling distance;
   determine that the filter is not in the regeneration-possible state, if the relative traveling distance does not reach a predetermined traveling distance determination threshold value, which can maintain the temperature of the oxidation catalyst at the high temperature for the regeneration of the filter; and determine that the filter is in the regeneration-possible state, if the relative traveling distance reaches the predetermined traveling distance determination threshold value.

2. The exhaust gas purification device according to claim 1, wherein the electronic controller stores a traveling distance of the vehicle that is calculated up to when an ignition key of the vehicle is turned off, if the ignition key of the vehicle is turned off after the electronic controller determines that the filter is not in the regeneration-possible state, and wherein the electronic controller calculates a new traveling distance of the vehicle upon turning on of the ignition key subsequent to the turning off of the ignition key, subtracts the stored traveling distance from the new traveling distance to obtain a differential traveling distance, and determines that the regeneration-possible state is reached when the differential traveling distance reaches the predetermined travelling distance determination threshold value.

3. The exhaust gas purification device according to claim 1 further comprising:

a regeneration process selection switch that is manually operable, wherein if the regeneration process selection switch is operated while the electronic controller is halting the regeneration of the filter, the electronic controller restarts the regeneration of the filter.

4. The exhaust gas purification device according to claim 1, wherein the filter is a diesel particulate filter.

5. The exhaust gas purification device according to claim 1 further comprising:

a temperature sensor to detect a temperature of the filter, wherein the electronic controller compares the detected temperature of the filter with a predetermined temperature to determine the amount of fuel to be supplied to the oxidation catalyst.

6. The exhaust gas purification device according to claim 1, wherein when an amount of the particulate matter collected by the filter reaches a predetermined amount while the electronic controller is halting the regeneration of the filter, the electronic controller restarts the regeneration of the filter.

7. The exhaust gas purification device according to claim 1, wherein the predetermined travelling distance determination threshold value is rewritable from outside.

8. The exhaust gas purification device according to claim 1, wherein the exhaust pipe injector is provided upstream of the oxidation catalyst to inject the fuel into the exhaust gas passage upstream of the oxidation catalyst.

9. The exhaust gas purification device according to claim 1, wherein the electronic controller determines that an amount of fuel supplied during the filter regeneration control is sufficient for the regeneration of the filter, if the amount of the fuel supplied is equal to or greater than a predetermined consumption lower threshold value.

10. The exhaust gas purification device according to claim 1, wherein when the electronic controller determines that the regeneration-possible state is reached while the filter regeneration control is halted, the electronic controller restarts the regeneration of the filter.

11. The exhaust gas purification device according to claim 10, wherein the electronic controller stores a traveling distance of the vehicle that is calculated up to when an ignition key of the vehicle is turned off, if the ignition key of the vehicle is turned off after the electronic controller determines that the filter is not in the regeneration-possible state, and wherein the electronic controller calculates a new traveling distance of the vehicle upon turning on of the ignition key subsequent to the turning off of the ignition key, subtracts the stored traveling distance from the new traveling distance to obtain a differential traveling distance, and determines that the regeneration-possible state is reached when the differential traveling distance reaches the predetermined travelling distance determination threshold value.

12. The exhaust gas purification device according to claim 1, wherein the electronic controller determines that the regeneration of the filter is complete when an amount of the particulate matter collected by the filter becomes lower than a predetermined value.

13. The exhaust gas purification device according to claim 12 further comprising:

a sensor to detect a pressure difference between a first pressure upstream of the filter and a second pressure downstream of the filter, wherein the electronic controller determines the amount of the particulate matter collected by the filter based on the detected pressure difference.

14. The exhaust gas purification device according to claim 12, wherein the electronic controller determines the amount of the particulate matter collected by the filter based on an engine revolution speed and an engine load.

15. An exhaust gas purification device of an internal combustion engine mounted on a vehicle, comprising:

an exhaust gas after-treatment unit provided in an exhaust gas passage of the internal combustion engine, the exhaust gas after-treatment unit having an oxidation catalyst and a filter, the filter configured to collect particulate matter contained in an exhaust gas, the oxidation catalyst being located upstream of the filter in a flow direction of the exhaust gas;

a fuel feed unit configured to feed a fuel to the oxidation catalyst; and a control unit configured to cause the fuel feed unit to feed the fuel to the oxidation catalyst to control regeneration of the filter, and to determine whether the filter is in a regeneration-possible state, in which a temperature of the oxidation catalyst is maintained at a high temperature and the filter is ready for regeneration, based on a traveling distance of the vehicle, the control unit being configured to halt the regeneration of the filter until the control unit determines that the regeneration-possible state is reached, if the control unit determines, during the filter regeneration control, that the filter is not in the regeneration-possible state, wherein the control unit calculates a traveling distance of the vehicle from when the control unit determines that the filter is not in the regeneration-possible state, and determines that the regeneration-possible state is reached when the calculated traveling distance reaches a predetermined traveling distance, wherein the control unit stores a traveling distance of the vehicle that is calculated up to when an ignition key of the vehicle is turned off, if the ignition key of the vehicle is turned off after the control unit determines that the filter is not in the regeneration-possible state, and wherein the control unit calculates a new traveling distance of the vehicle upon turning on of the ignition key subsequent to the turning off of the ignition key, subtracts the stored traveling distance from the new traveling distance to obtain a differential traveling distance, and determines that the regeneration-possible state is reached when the differential traveling distance reaches the predetermined traveling distance.

16. An exhaust gas purification device of an internal combustion engine mounted on a vehicle, comprising:

an exhaust gas after-treatment unit provided in an exhaust gas passage of the internal combustion engine, the exhaust gas after-treatment unit having an oxidation catalyst and a filter, the filter configured to collect particulate matter contained in an exhaust gas, the oxidation catalyst being located upstream of the filter in a flow direction of the exhaust gas;

a fuel feed unit configured to feed a fuel to the oxidation catalyst; and a control unit configured to cause the fuel feed unit to feed the fuel to the oxidation catalyst to control regeneration of the filter, and to determine whether the filter is in a regeneration-possible state, in which a temperature of the oxidation catalyst is maintained at a high temperature and the filter is ready for regeneration, based on a traveling distance of the vehicle, the control unit being configured to halt the regeneration of the filter until the control unit determines that the regeneration-possible state is reached, if the control unit determines, during the filter regeneration control, that the filter is not in the regeneration-possible state, wherein when the control unit determines that the regeneration-possible state is reached while the filter regeneration control is halted, the control unit restarts the regeneration of the filter, wherein the control unit calculates a traveling distance of the vehicle from when the control unit determines that the filter is not in the regeneration-possible state, and determines that the regeneration-possible state is reached when the calculated traveling distance reaches a predetermined traveling distance, wherein the control unit stores a traveling distance of the vehicle that is calculated up to when an ignition key of the vehicle is turned off, if the ignition key of the vehicle is turned off after the control unit determines that the filter is not in the regeneration-possible state, and wherein the control unit calculates a new traveling distance of the vehicle upon turning on of the ignition key subsequent to the turning off of the ignition key, subtracts the stored traveling distance from the new traveling distance to obtain a differential traveling distance, and determines that the regeneration-possible state is reached when the differential traveling distance reaches the predetermined traveling distance.

\* \* \* \* \*